United States Patent [19]

Guevara et al.

[11] 3,772,011

[45] Nov. 13, 1973

[54] PRINT-OUT ELEMENTS AND METHODS USING PHOTOCONDUCTORS AND POLYGNES

[75] Inventors: Alfredo R. Guevara, Webster; Paul M. Borsenberger, Hilton, both of N.Y.

[73] Assignee: Eastman Kodak Company, Rochester, N.Y.

[22] Filed: Nov. 4, 1971

[21] Appl. No.: 195,778

[52] U.S. Cl. ........................ 96/1 R, 96/1.5, 96/35.1, 96/115 R, 96/48 QP, 96/68, 204/62, 204/159.14, 204/159.2

[51] Int. Cl. ........ G03g 5/06, G03g 5/08, G03c 5/04

[58] Field of Search ..................... 96/1 R, 1 PC, 1.5, 96/35.1, 115 P, 115 R; 204/72, 165, 159.22, 131

[56] References Cited

UNITED STATES PATENTS

| | | | |
|---|---|---|---|
| 3,501,303 | 3/1970 | Foltz et al. | 96/88 |
| 3,615,420 | 10/1971 | Deutsch | 96/1 R X |
| 3,409,431 | 11/1968 | Deutsch | 96/1 R X |
| 2,726,204 | 12/1955 | Park et al. | 204/72 |
| 3,615,630 | 10/1971 | Dietrich | 96/115 P |
| 3,664,993 | 5/1972 | D'Alelio | 204/159.22 X |
| 3,037,010 | 5/1962 | Harris | 204/159.22 X |
| 1,963,074 | 6/1934 | Carothers et al. | 96/115 P |

*Primary Examiner*—Roland E. Martin, Jr.
*Attorney*—Robert W. Hampton et al.

[57] ABSTRACT

Print-out elements and methods are described which involve a crystalline polyacetylenic compound in, or in contact with a photoconductive layer. Visible images are obtained with these layers in contact by imagewise exposure coupled with the application of an electric potential. In the absence of an applied potential, the elements described are stable under normal room-light handling conditions.

21 Claims, 4 Drawing Figures

ALFREDO R. GUEVARA
PAUL M. BORSENBERGER
INVENTOR.

BY [signature]

ATTORNEY

PRINT-OUT ELEMENTS AND METHODS USING PHOTOCONDUCTORS AND POLYGNES

BACKGROUND OF INVENTION

1. Field of Invention

This invention relates to the field of non-silver direct print-out imaging and to elements and methods for producing print-out images. More particularly, this invention relates to the use of electrographic techniques and materials for obtaining direct print-out images.

2. Description of Prior Art

Deutsch U. S. Pat. No. 3,409,431 and Levinos and Deutsch Canadian Pat. No. 818,390 describe a layered imaging element involving a photoelectropolymerization process wherein a photoconductor is used to modulate the electric current passed through a liquid vinyl monomer layer containing a metal salt. An electric current passing through the exposed areas of the photoconductor and corresponding areas of the vinyl monomer layer essentially neutralizes the ability of the metal salt to promote the polymerization of the vinyl monomer. After deactivation of the metal salt in the monomer layer, a peroxide compound can be introduced into the vinyl monomer causing polymerization in those areas which have not been deactivated. The system thus produces a direct positive image of poor resolution, i.e., only about 5–8 line-pairs per millimeter (see page 184, *Photographic Science and Engineering*, Vol. 13, 1969). Typically, the resultant image is almost invisible and must be stained or otherwise colored to render an image of suitable density. This process, while useful, suffers from the disadvantages of involving several steps along with poor resolution.

U. S. Pat. No. 3,501,303 involves imaging elements comprised of a carrier having fixedly positioned thereon discrete crystals of certain photosensitive polyacetylenic compounds. The process involves imagewise exposure of the element to certain radiant energy. This exposure induces a color change in the individual crystals. The unexposed portion is then rendered insensitive by various techniques. The materials described are essentially insensitive to visible light and thus, the subject matter described in U. S. Pat. No. 3,501,308 represents an improvement thereof. This latter patent provides sensitivity to the visible region by the addition of certain electron acceptors to the photosensitive layer. This increase in sensitivity, however, gives rise to an accompanying disadvantage in that such elements cannot be handled under room light conditions without resulting in exposure and color formation.

Thus, it is evident that there is a need for a non-silver direct print system which is simple to use, is of high sensitivity and which is stable under room light handling conditions directly after formation of a visible image without the need for additional fixation techniques.

SUMMARY OF THE INVENTION

We have found that a layer of microcrystals of a photosensitive polyacetylenic compound undergoes direct imagewise polymerization to a highly colored polymeric product when contiguous to a photoconductive layer which is exposed during the application of an electric potential across the polyacetylenic layer and the photoconductive layer. It is believed that this direct polymerization is the result of charge carriers, ions or free radicals being injected into the polyacetylenic layer from the photoconductive layer. Regardless of the mechanism, this system has the capability of image formation upon exposure to electromagnetic radiation of wavelengths known to have no photochemical effect upon the polyacetylenic layer alone. Thus, exposure sources can include those which are too low in energy to directly polymerize the polyacetylenic layer. This system has the further capability of producing continuous tone images having a resolution of at least about 25–30 line-pairs per millimeter and utilizes elements which are stable under room light handling without the need of any separate stabilization processes.

DESCRIPTION OF PREFERRED EMBODIMENTS

The objects of the present invention are accomplished by the use of crystalline polyacetylenic compounds in a contiguous relationship with photoconductive compositions. The various combinations of polyacetylenic compounds (or polyynes) and photoconductors are placed between two conductive layers and imagewise exposed to actinic radiation in the presence of an applied electrical potential between the two conductive layers. This combination of imagewise exposure with an applied electrical potential results in the imagewise polymerization of the polyyne material to a highly colored reaction product.

Figure 1:
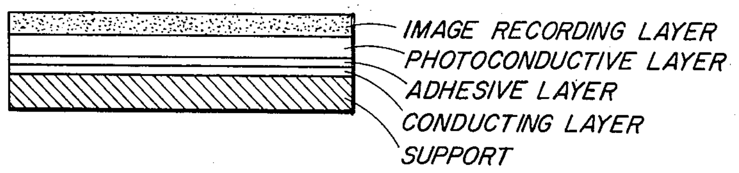
FIG. 1 is a schematic representation of a multilayer element of the invention.
Figure 2:
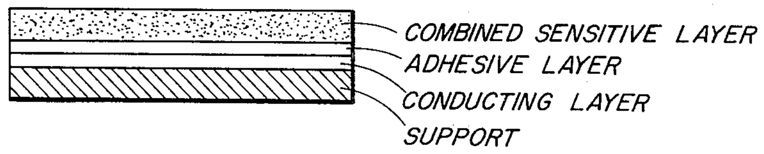
FIG. 2 is a schematic representation of an element having a combined sensitive layer.
Figure 3:
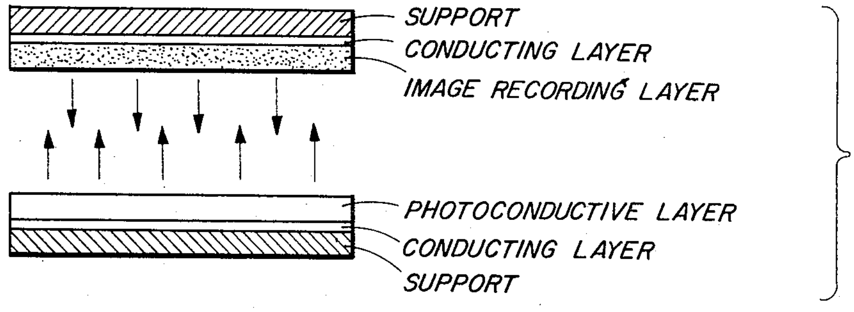
FIG. 3 is a schematic representation of separately coated elements for use in a two-film exposing mode.

The elements utilized in this invention can be prepared in a variety of forms. FIG. 1 is representative of a single multilayer element comprising a conductive support (i.e., a support bearing a conducting layer), optionally bearing an adhesive layer, which has thereon a layer of photoconductive composition. The structure to this point is similar to many standard electrophotographic elements described in the art. Such a standard element has applied to the photoconductive layer thereof an image recording layer comprising a crystalline polyyne compound having a minimum of two acetylenic linkages as a conjugated system. This latter layer can be a binder free layer or can involve a binder material such as gelatin, polyvinylalcohol, other polymers, etc. Additionally, as shown in FIG. 2, the polyyne material can be distributed in the photoconductive layer thereby omitting one layer from the element. A further embodiment of the invention is shown in FIG. 3 wherein the photoconductive element is separate from the image recording element. In this configuration, the two elements are placed in face-to-face contact during exposure.

The polyacetylenic materials useful in this invention include numerous polyacetylenic compositions reported in the literature as exhibiting color change upon exposure to actinic radiation. Such photosensitive polyacetylenic or polyyne compounds taught in the art contain a minimum of two acetylenic linkages as a conjugated system (i.e., —C ≡ C—C ≡ C—) and, with only a few exceptions, carbon atoms in alpha positions to the acetylenic carbon atoms, i.e., those carbon atoms directly connecting to the acetylenic carbon atoms, are bonded directly onto to carbon and/or hydrogen atoms. These photosensitive polyacetylenic compositions of matter encompass diynes, triynes, tetraynes, higher polyynes and numerous derivatives and related compounds thereof of various chemical classes ranging from hydrocarbon compounds to acids, esters, diols, to still other compounds of other chemical classifications containing numerous and varied organic radicals stemming from the conjugated acetylenic carbon atoms, all of which are termed polyyne compounds for purposes of this invention.

As is apparent from publications of such investigators as Arthur Seher, Ferdinand Bohlmann et al., R. H. Jones and M. C. Whiting, procedures are knotn in the art for preparation of polyacetylenic compositions. Preparatory techniques are also taught in U. S. Pat. Nos. 2,816,149; 2,941,014; 3,065,283; etc. General preparative methods include: oxidative coupling or oxidative dehydrocondensation reactions of numerous terminal acetylenic compounds to prepare as desired, symmetrical and unsymmetrical polyyne compounds; dehydrohalogenation reactions to provide compounds containing acetylenic bonds; and variations, modifications and combinations of such two basic reactions to provide preparative routes for a multitude of photosensitive polyacetylenic compositions of matter.

It is within the skill of the art to readily evaluate a polyyne's photosensitivity where the same is unknown. One needs merely to expose samples of a prepared crystalline polyacetylenic composition of matter to various forms of radiant energy and to observe whether a visible color change occurs in the exposed composition. If a visible color change occurs upon exposure to a form of radiant energy, then the crystalline polyacetylenic composition of matter is deemed photosensitive for purposes of the present invention.

Illustrative and representative of the radiant-energy sensitive crystalline polyacetylenic compounds to which the invention is applicable are those disclosed in U. S. Pat. Nos. 3,501,297; 3,501,302; 3,501,303; and 3,501,308. Of particular utility are those polyacetylenic compounds disclosed in concurrently filed applications of James C. Fleming and Paul E. Driedger, entitled "Photosensitive Elements Comprising Polyacetylenic Bis Urethanes," Ser. No. 153,060 now abandoned; Melvin S. Bloom and Sally S. Fico, entitled "Photosensitive Elements Comprising Polyacetylenic Amine Salts", Ser. No. 153,059; and Melvin S. Bloom, entitled "Photosensitive Elements Comprising Alkylamide Polyacetylenic Compounds," Ser. No. 153,053 now abandoned, all filed June 14, 1971.

As mentioned previously, the polyyne material can be coated as a separate layer in a suitable binder (see FIGS. 1 and 3). Exemplary binder materials include: natural and synthetic plastics, resins, waxes, colloids, gels and the like, including gelatins, desirably photographic-grade gelatin) various polysaccharides including dextran, dextrin, hydrophilic cellulose ethers and esters, acetylated starches, natural and synthetic waxes including paraffin, beeswax, polyvinyllactams, polymers of acrylic and methacrylic esters and amides, hydrolyzed interpolymers of vinyl acetate and unsaturated addition polymerizable compounds such as maleic anhydride, acrylic and methacrylic esters and styrene, vinyl acetate polymers and copolymers and their derivatives including completely and partially hydrolyzed products thereof, polyvinyl acetate, polyvinyl alcohol, polyethylene oxide polymers, polyvinylpyrrolidine, polyvinyl acetals including polyvinyl acetaldehyde acetal, polyvinyl butyraldehyde acetal, polyvinyl sodium-o-sulfobenzaldehyde acetal, polyvinyl formaldehyde acetal, and numerous other known photographic binder materials. As is well known in the art in the preparation of smooth uniform continuous coatings of binder materials, there may be employed therewith small amounts of conventional coating aids as viscosity controlling agents, leveling agents, dispersing agents, and the like. The particular binder material employed is selected with due regard to the specific radiant energy and technique to be employed in the particular image-recording application, and invariably is a binder material permitting substantial transmission of that specific radiant energy to be employed.

An especially useful technique for forming layers of polyyne material in a binder is described in Fico and Manthey application Ser. No. 153,061, filed June 14, 1971, and entitled "Stable Photosensitive Polyacetylenic Elements and the Preparation Thereof" now abandoned. Of course, various other methods well known in the art can be used such as described in U. S. Pat. No. 3,501,302.

If it is desired to prepare a binder-free layer of polyyne material, this can be accomplished by applying to a substrate a solution of polyyne in a suitable solvent followed by drying.

FIG. 3 shows an image-recording element wherein the polyyne layer is carried on its own substrate and the photoconductive element is separate. Useful substrates for carrying a polyyne layer would include numerous materials known in the art. However, for purposes of this invention, an intermediate conductive layer is used as seen in FIG. 3. This conducting layer can be formed of a variety of materials as known in the art of electrophotographic elements and discussed further below.

As indicated previously, the photoconductor-containing portion of this invention essentially involves structures well known in the art of electrophotographic elements. Typically, such elements involve a support bearing a layer of photoconductive composition comprised of a photoconductor and a binder or just a polymeric photoconductor. Useful photoconductors can be selected from a variety of inorganic or organic including organo-metallic photoconductors as well as combinations thereof. Representative inorganic photoconductors include cadmium sulfide, zinc oxide, titanium dioxide, lead oxide and others as described, for example, in U. S. Pat. No. 3,121,006. Additionally, charge transfer combinations, e.g., those comprising a photoconductor and a Lewis acid may also be utilized.

Examples of the broad class of organic photoconductors include the following:

A. Arylamine photoconductors including substituted and unsubstituted arylamines, diarylamines, nonpolymeric triarylamines and polymeric triarylamines such as those described in U. S. Pat. Nos. 3,240,597 and 3,180,730.

B. Photoconductors represented by the formula:

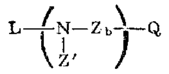

where Z and Z′ are aromatic radicals, Q is a hydrogen atom or an aromatic amino group, such as Z′NH—; *b* is an integer from 1 to about 12, and L is a hydrogen atom or an aromatic radical, these materials being more fully described in U. S. Pat. No. 3,265,496.

C. Polyarylalkane photoconductors including leuco bases of diaryl or triarylmethane dye salts, 1,1,1-triarylalkanes wherein the alkane moiety has at least two carbon atoms and tetraarylmethanes having an amino group substituted in at least one of the aryl nuclei attached to the alkane and methane moieties of the latter two classes of photoconductors which are non-leuco base materials; and also other polyarylalkanes included by the formula:

wherein each of D. E and G is an aryl group and J is a hydrogen atom, an alkyl group, or an aryl group, at least one of D, E and G containing an amino substituent, these materials being more fully described in U. S. Pat. No. 3,274,000, French Pat. No. 1,383,461 and in U. S. Pat. No. 3,542,544 by Seus and Goldman.

D. Photoconductors comprising 4-diarylamino substituted chalcones having the formula:

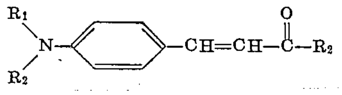

wherein $R_1$ and $R_2$ are each phenyl radicals including substituted phenyl radicals, these materials being more fully described in Fox U. S. Pat. No. 3,526,501 and other chalcones as disclosed in U. S. Pat. No. 3,265,497.

E. Non-ionic cycloheptenyl compounds which may be substituted with substituents such as aryl, hydroxy, azido, nitrogen heterocycles, or oxycycloheptenyl; these compounds being more fully described in U. S. Pat. No. 3,533,786.

F. Compounds containing an

nucleus, including N,N-bicarbazyls and tetra-substituted hydrazines, which compounds are more fully described in U. S. Pat. No. 3,542,546.

G. Organic compounds having a 3,3′-bis-aryl-2-pyrazoline nucleus which is substituted in either five-member ring with the same or different substituents. These organic photoconductors are more fully described in U. S. Pat. No. 3,527,602.

H. Triarylamines in which at least one of the aryl radicals is substituted by an active hydrogen-containing group or a vinyl or vinylene radical having at least one active hydrogen-containing group. These materials are more fully described in Belgian Pat. No. 728,563, dated Apr. 30, 1969.

I. Organo-metallic compounds having at least one aminoaryl substituent attached to a Group IV*a* or Group V*a* metal atom such as silicon, germanium, tin and lead from Group IV*a* and phosphorus, arsenic, antimony and bismuth from Group V*a*. These materials can be substituted in the metallo nucleus with a wide variety of substituents but at least one of the substituents must be an aminoaryl radical. These materials are described in Canadian Pat. No. 818,539, issued July 22, 1969.

J. Polymeric organic photoconductors such as poly-N-vinyl-carbazoles and related vinyl polymers, such materials being disclosed, for example, in U. S. Pat. Nos. 3,037,861; 3,155,502; 3,418,116; 3,421,891 and 3,232,755.

K. Aggregate-type photoconductors as described in British Pat. No. 1,153,506, dated Sept. 24, 1969.

L. Any other organic compound which exhibits photoconductive properties such as those set forth in Australian Pat. No. 248,402.

Representative organic photoconductors useful in this invention include the compounds listed below:

triphenylamine
4,4′-diethylamino-2,2′-dimethyltriphenylmethane
4′,4″-diamino-4-dimethylamino-2′,2″-dimethyltriphenylmethane
4′,4″-bis(diethylamino)-2,6-dichloro-2′,2″-dimethyltriphenylmethane
2′,2″-dimethyl-4,4′,4″-tris(dimethylamino)triphenyl-methane
4′,4″-bis(diethylamino)-4-dimethylamino-2,2′,2″-trimethyltriphenylmethane
4′,4″-bis(dimethylamino)-2′,2″-dimethyl-4-methoxytriphenylmethane
bis(4-diethylamino)-tetraphenylmethane
4,4′-bis(diphenylamino)chalcone
tetra-4-tolylhydrazine
poly-N-vinylcarbazole
monobrominated poly-N-vinylcarbazole
dibrominated poly-N-vinylcarbazole
N,N′-bicarbazyl
3,3′-bis(1,5-diphenyl-2-pyrazoline)
1,5-diphenyl-3-[3′-(1′-p-tolyl-5′-phenyl)-2′-pyrazolyl]-2-2-pyrazoline
p-diphenylaminostyrene
p-diphenylaminocinnamic acid
triphenyl-p-dimethylaminophenylstannane
triphenyl-p-diethylaminophenylplumbane
tetra-p-diethylaminophenylplumbane
phenyl-tri(p-diethylaminophenyl)stannane
tetra-p-diethylaminophenylgermane
p-diethylaminophenylarsine Although some polymeric organic photoconductors can be coated on a support without being blended with resinous binder materials, it is usually necessary or at least desirable to blend organic as well as inorganic photoconductors with a resinous or plastic material which serves as a matrix or binder for coating the photoconductor on its support. The photoconductive element or layer thus would include both the active organic or inorganic photoconductor and the resinous binder, if one is used.

Preferred binders for admixture with the photoconductive compounds in preparing the photoconductive layers of the present invention include polymers having fairly high dielectric strength which are good electrically insulating film-forming vehicles. Materials of this type include styrene-butadiene copolymers; silicone resins; styrene-alkyd resins; silicone-alkyd resins; soya-alkyd resins; poly(vinyl chloride); poly(vinylidene chloride); vinyl chloride-vinylidene chloride copolymers; vinylidene chloride-acrylonitrile copolymers; poly(vinyl acetate); vinyl acetate-vinyl chloride copolymers; poly(vinyl acetals), such as poly(vinyl butyral); polyacrylic and methacrylic esters, such as poly(methyl methacrylate), poly(n-butylmethacrylate), poly(isobutyl methacrylate), etc; polystyrene; nitrated polystyrene; polymethylstyrene; isobutylene polymers; polyesters, such as copoly[ethylene-co- alkylenebis-(alkyleneoxyaryl)phenylenedicarboxylate], e.g., poly[-ethylene-co-isopropylidene-2,2-bis(ethyleneoxy-phenyl)terephthalate]; phenolformaldehyde resins; ketone resins; polyamides; polycarbonates; polythiocarbonates; copolymers of vinyl haloarylates and vinyl acetate such as poly(vinyl-m-bromobenzoate-co-vinyl acetate); waxes, chlorinated polyethylene, etc. Especially preferred are thermoplastic resins. Suitable resins are sold under such trademarks as Vitel PE-101, Cymac, Piccopale 100, Saran F-220, Lexan 145 and Geon 222. Also, mixtures of these binders can be used.

Sensitizing compounds useful with the photoconductive elements of the present invention can be selected from a wide variety of materials, including such materials as pyrylium dye salts including thiapyrylium dye salts and selenapyrylium dye salts disclosed in VanAllan et al U. S. Pat. No. 3,250,615; fluorenes, such as 7,-12-dioxo-13-dibenzo(a,h)fluorene, 5,10-dioxo-4a,11-diazabenzo(b)fluorene, 3,13-dioxo-7-oxadibenzo(b,g)-fluorene, and the like; aggregate-type sensitizers of the type described in Belgian Pat. No. 705,117, dated Apr. 16, 1968; aromatic nitro compounds of the kind described in U. S. Pat. No. 2,610,120; anthrones like those disclosed in U. S. Pat. No. 2,670,284; quinones, U. S. Pat. No. 2,670,286; benzophenones, U. S. Pat. No. 2,670,287; thiazoles, U. S. Pat. No. 2,732,301; mineral acids; carboxylic acids, such as maleic acid, di- and trichloroacetic acids, and salicylic acid; sulfonic and phosphoric acids; and other electron acceptor compounds as disclosed by H. Hoegl, *J. Phys, Chem.*, 69, No. 3, 755–766 (March, 1965), and U. S. Pat. No. 3,232,755.

The amount of sensitizer that can be added to a photoconductor layer to give effective increases in speed can vary widely. The optimum concentration will vary with the specific photoconductor and sensitizing compound used. In general, substantial speed gains can be obtained where an appropriate sensitizer is added in a concentration range from about 0.001 to about 10 weight percent of more based on the weight of the coating composition. Normally, sensitizers are added to the coating composition in an amount of about 0.005 to about 5.0 percent by weight of the total coating composition.

Coating thicknesses of the photoconductive composition on a support can vary widely. Normally, a coating in the range of about 1$\mu$ to about 250$\mu$ after drying is useful for the practice of this invention. The preferred range of coating thickness is found to be in the range from about 2$\mu$ to about 50$\mu$ after drying although useful results can be obtained outside of this range.

Suitable supporting materials for the photoconductive layers of the present invention can include any of a wide variety of electrically conducting supports, for example, various conducting papers; aluminum coated paper; aluminum-paper laminates; metal foils such as aluminum foil, zinc foil, etc; metal plates such as aluminum, copper, zinc, brass, and galvanized plates; vapor deposited metal layers such as silver, nickel or aluminum on conventional glass or film supports such as cellulose acetate, poly(ethylene terephthalate), polystyrene and the like conducting supports. An especially useful conducting support can be prepared by coating a support material such as poly(ethylene terephthalate) with a layer containing a semiconductor dispersed in a resin as described in U. S. Pat. No. 3,245,833 or vacuum deposited on the support. Likewise, a suitable conducting coating can be prepared from the sodium salt of a carboxyester lactone of a maleic anhydride-vinyl acetate copolymer. Such kinds of conducting layers and methods for their optimum preparation and use are disclosed in U. S. Pat. Nos. 3,007,901; 3,245,833 and 3,267,807.

If necessary or desirable, an adhesive interlayer can be used between the photoconductive layer and the conducting support as shown in FIG. 1. Materials useful for this layer can include a variety of substances such as poly(vinyl acetate) described in U. S, Pat. No. 3,438,773. In addition to single polymers, blends of materials or copolymers can be used for preparing these interlayers such as poly(vinylacetate-co-vinylpyrrolidone) and others as described in copending Yoerger and Staudenmayer U. S. application Ser. No. 174,956, filed Aug. 25, 1971, and entitled ELECTROPHOTOGRAPHIC ELEMENTS HAVING BARRIER LAYERS. Terpolymers of methyl acrylate, vinylidene chloride and itaconic acid are also useful.

Figure 4:
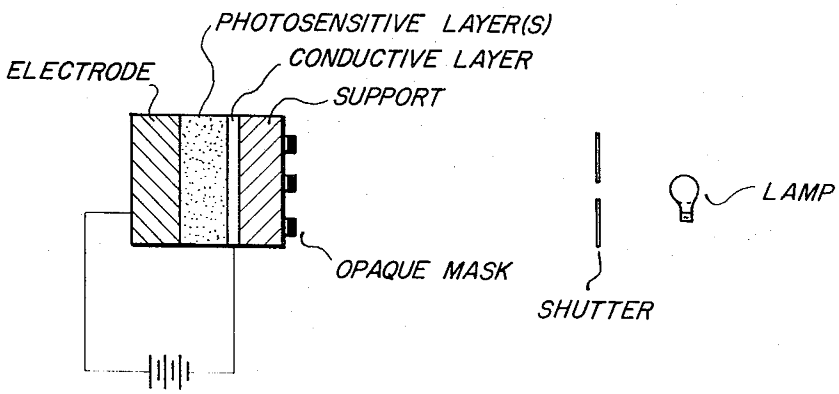
FIG. 4 is a schematic representation of the electrical connection and exposing arrangement utilized in this invention.

In accordance with this invention, the polyyne and photoconductor compositions are subjected to an electric field. FIG. 4 shows one such suitable configuration for applying the electric field during exposure. As mentioned previously, the photoconductive element typically contains a conductive layer which can be used as one electrode in applying the field. The other electrode can be a separate backing electrode which is placed on top of the polyyne composition or as seen, for example, in FIG. 3, the second electrode can be the conducting layer of the image-recording element shown therein. The particular configuration for this purpose is variable to suit one's needs. In the configuration shown in FIG. 4, an opaque mask is placed over the transparent support of the photoconductive element and subjected to an exposure during the application of an electric field. Typically, the applied potential is in the nature of about 200 to about 1,500 volts. This arrangement for exposure and application of the field is shown merely as a representation of one of the various arrangements in which exposure can be accomplished. We have established that the backing electrode contiguous to the polyyne material need not be in intimate contact therewith but an insulating layer or an air gap can be interposed therebetween if necessary or desirable.

In those embodiments wherein the polyyne material is coated directly onto a photoconductive element as described above, it is preferred that the photoconductive layer, the conducting layer and the support all be translucent. When the polyyne material is coated as a separate element as shown in FIG. 3, the support and/or conducting layer can be translucent or even opaque, as desired.

A particular advantage of the present elements, especially those in which the polyyne is dispersed in the photoconductor, is their ability to be handled in normal room-light conditions without causing unwanted background density or other detrimental effects. This property arises from the fact that visible images are obtained by the combined effects of radiation and an applied electric potential and not merely by radiation alone. A further advantage of the instant polyyne-containing materials is that the elements are more versatile than any previous elements utilizing polyynes in that the image-forming radiation need not be restricted to that of the relatively narrow sensitivity range of the particular polyyne utilized. That is to say, it is the sensitivity of the photoconductive material which is utilized and not the limited sensitivity of the polyyne. As is well known in the art, photoconductive materials are available which have a broad range of sensitometric properties. It is well known, for example, that photoconductive materials exhibit sensitivity to electromagnetic radiation ranging in wavelength in the X-ray region through ultraviolet and on through the visible region and into the infrared. Thus, it is readily seen that print-out materials according to this invention can be prepared which are at least sensitive to x-ray through infrared radiation.

The invention will be further described by the following examples.

Example 1

A 0.004 inch thick poly(ethylene terephthalate) film base is coated with a semi-transparent, vacuum-deposited, nickel conducting layer which, in turn, is overcoated with an adhesive subbing. The resultant translucent support is coated with a 5 percent by weight solution of poly(n-vinylcarbazole) in methylene chloride at room temperature. The coating is maintained under ambient conditions for 2 hours and then placed in a vacuum chamber for one-half hour at a pressure of less than 1.0 torr in room temperature. The multilayer coating is then overcoated at room temperature with a polyyne dispersion prepared as follows:

A. Polyyne Solution
- 1.2 g. 10,12-docosadiynedioic acid, monomethyl ester
- 3.0 ml. ethyl acetate B. Coating Dispersion
- 12.0 ml. 5 percent aqueous gelatin solution and preservative
- 13.5 ml. distilled water
- 1.5 ml. Surfactant 10 percent alcohol-water solution of Alkanol XC (DuPont)
- 3.0 ml. Filtered polyyne Solution A The resultant composition is then brought to a total weight of 30 g. by the addition of distilled water followed by dispersing utilizing an ultrasonic probe for approximately 2 minutes. The dispersion is coated as described above followed immediately by cooling of the layer in order to chill-set the gelatin. After 2 hours drying at ambient conditions, the coating is placed in a vacuum dessicator and further dried for a half-hour at room temperature and less than 1 mm. of mercury pressure. Next, a voltage of −300 volts is impressed across the device as shown in FIG. 4 which results in a current flow of $6.0 \times 10^{-8}$ amps/cm$^2$. The shutter is then opened in order to allow the xenon lamp to illuminate the element; this resulted in a current flow of $1.5 \times 10^{-5}$ amps/cm$^2$. The element is maintained in the field with the lamp on for 4 hours after which the element is removed. In those regions affected both by exposure and the field, a dark blue image is formed. However, in those regions which were influenced by the electrical field, but were not exposed, no image results. Similarly, a similar sample subjected to the same conditions in the absence of electric field exhibits no image.

Example 2

Two samples of the composite multilayer film described in Example 1 are exposed at a distance of 30 cm. from a 150 watt xenon lamp while a −300 volt electric potential is applied. This time the exposure lasts 83 minutes and again, a dense blue image results only in areas affected by both exposure and applied field.

Example 3

A sensitive element as prepared in Example 1 is placed under an electric potential in the configuration shown in FIG. 4 and an exposure is made for 83 minutes with the bias on the external circuit reversed, i.e., the applied potential is +300 volts. Again, a field and radiation-dependent dense blue image is observed.

Example 4

The procedure as described in Example 2 is repeated using an exposure time of 20 minutes and an applied potential of −700 volts. The resultant image has approximately the same optical density, but greater uniformity than previous images.

Example 5

The procedure of Example 4 is repeated except that the potential applied is −1,000 volts. A highly uniform image is observed as previously, only the optical density of this image is greater than that of Example 4.

Example 6

The procedure of Example 4 is again repeated using a potential of −1,200 volts to form a highly uniform blue image which has an optical density about the same as that of Example 5. Electrical potentials at or above this level result in mechanical breakdown of the particular film utilized.

Example 7

The procedure of Example 4 is repeated using a voltage of −800 volts and an exposure time of 10 minutes with a resolution test transparency as the opaque mask. The resulting uniform dense blue image is similar to that described previously. The resolution of the system with the test transparency separated from the photoconductive layer of about 100 microns is approximately 30 lines/mm.

Example 8

The procedure of Example 4 is again repeated using a potential of −800 volts and an exposure time of 45 minutes with a continuous-tone transparent photographic negative placed between the multilayer film and the radiation source. A good quality, continuous-tone, positive-appearing reproduction results.

As mentioned previously, the present multilayer photosensitive element can be prepared using a binderless film of polyacetylenic material cast from a suitable solvent as opposed to the polyyne-gelatin dispersion described in the preceding examples. This embodiment is further illustrated in the following examples.

Example 9

The procedure described in Example 1 is used to prepare an organic photoconductive layer on a conductive transparent support. A 10 percent solution of 10,12-docosadiynedioic acid monomethyl ester in dichloroethane is passed through medium grade paper filter and coated over the photoconductor-containing layer resulting in a composite multilayer structure as seen in FIG. 1. A series of elements are so prepared and exposed in a configuration of the type described in Example 1 which results in imagewise formation of a blue product under the exposure conditions designated below:

| Element | Voltage | Incident Exposing Energy, ergs/cm² | $D_{max}$* |
|---|---|---|---|
| A | +1800 | $1 \times 10^4$ | 0.20 |
| B | −1500 | $6.7 \times 10^3$ | 0.20 |
| C | +1500 | $2.8 \times 10^3$ | 0.20 |
| D | −1500 | $2.8 \times 10^3$ | 0.20 |
| E | +1000 | $6.2 \times 10^5$ | 0.9 |
| F | +1200 | $6.2 \times 10^5$ | 1.0 |
| G | +1500 | $6.2 \times 10^5$ | 1.2 |
| H | +900 | $3.4 \times 10^3$ | 0.2 |
| I | +900 | $3.4 \times 10^4$ | 0.2 |

*Maximum transmission density with a red filter in the densitometer beam.
The exposing source wavelength for all of the above exposures is 340 ± 15 nm.

Example 10

A photoconductive coating on a conductive support is prepared as described in Example 9. A 10 percent solution of the polyyne of Example 9 in dichloromethane is prepared and filtered as in the preceding example. Four composite multilayer coatings are prepared by overcoating the photoconductive layer with the binderless diyne solution using doctor blades of the following wet clearance:

| Element | Wet Coating Thickness, in. | Dry Thickness, (μm) |
|---|---|---|
| J | 0.004 | 5.0 |
| K | 0.003 | 3.7 |
| L | 0.002 | 2.5 |
| M | 0.001 | 1.3 |

Element J is exposed in a configuration described in Example 1 using a +1,200 volt applied potential and a wavelength range for the exposing source of 340 ± 15 nm. The incident exposing energy is varied as indicated below with all of the exposures resulting in imagewise formation of a blue product.

| No. | Incident Exposing Energy, erg/cm² |
|---|---|
| 1 | $3.4 \times 10^4$ |
| 2 | $3.4 \times 10^3$ |
| 3 | $4.1 \times 10^2$ |
| 4 | $4.3 \times 10^1$ |
| 5 | $1.25 \times 10^1$ |

The maximum transmission density to red of exposure No. 5 (which receives the lowest incident energy exposure) was 0.15.

The preceding examples indicate various aspects of the invention wherein the polyyne material is coated as a separate layer. As mentioned previously, the polyacetylenic compounds utilized in this invention can be incorporated directly into the photoconductive layer. For example, the polyyne may be dispersed directly in a polymeric organic photoconductor with the photoconductor acting as a binder therefor. Coatings of this type offer advantages relative to coatings in which the polyyne is dispersed in gelatin as a separate layer. One advantage is that the gelatin phase is eliminated, thus making possible an improved electrical contact between the elements of the system. A further advantage is that the polyyne is typically protected from direct photolysis due to the high absorbance of 250–300 nm. radiation by the photoconductor. A further advantage is that the photographic speed of such one-layer system is typically greater than that of the two-layer elements. This aspect of the invention is further illustrated by the following examples.

Example 11

A 5.5 percent by weight solution of poly(n-vinylcarbazole) in dichloromethane is prepared. To 10 grams of this solution is added 0.20 grams of the diyne of Example 1 which results in a polyyne-to-photoconductor ratio of 0.36. The solution is coated on a nickel-coated film support, dried, and the element exposed to ultraviolet radiation of a wavelength ranging from 330 to 365 nm. with an incident intensity of $10^{17}$ quanta. During this exposure, an external potential of +1,200 volts is applied across the element in a manner similar to that shown in FIG. 4. A blue image having a red density of 0.05 is obtained in regions of the coating which were affected by both light and the electrical field.

Example 12

A one-layer film such as that described in Example 11 is prepared using a polyyne to photoconductor ratio of 0.55. An incident exposure of $10^{17}$ quanta as described in the preceding example under an external potential of +1,200 volts results in a blue image having a red density of 0.17. The second sample of the same material is exposed to $2 \times 10^{17}$ incident quanta at the same applied potential which results in a blue image having a red density of 0.38. A third sample of the same coating is exposed to $2 \times 10^{17}$ incident quanta under an external potential of −1,200 volts and results in a blue image having a red density of 0.05.

Example 13

A 5 percent solution by weight of poly(n-vinylcarbazole) is prepared using dichloromethane as the solvent. To 12.5 grams of this solution, the monomethylester of 10,12-docosadiynedioic acid is added. The solution is coated at 55°F on a 0.5 optical density nickel-coated, poly(ethylene terephthalate) film support. A sample of the coating is exposed under a +1,000 volt potential to $6 \times 10^5$ ergs/cm² of ultraviolet radiation in the range of 330 to 365 nm. A blue image having a red density of 0.25 is obtained. A second sample exposed under identical conditions with a reversed polarity similarly yields a blue image having a red density of 0.25.

The three preceding examples have all involved a unitary photoconductor polyyne element. As previously discussed, another aspect of this invention involves the use of separate elements containing a photoconductive layer and a polyyne layer as illustrated in FIG. 3. The separate elements are then superposed and exposed with an applied potential as described above. The two films can then be separated and the photoconductive element may be reused. This configuration has economic advantages resulting from the reuse capability. A further advantage is that the photoconductive layer is not present in the final image containing film. This allows the use of highly colored photoconductors which may possess the advantages of greater spectral response and higher photographic speed without any detrimental image masking effects. Furthermore, the use of certain other optically dense or highly opaque photoconductive elements, e.g., inorganic photoconductor dispersions, is permitted by the use of this technique. The following five examples will further illustrate this aspect of the invention.

Example 14

A 5 percent solution of poly(n-vinylcarbazole) in dichloromethane is applied to a nickel-coated poly(ethylene terephthalate) support to form a photoconductive layer having an estimated dry thickness of about 5 microns. A filtered 10 percent solution of the polyyne of Example 5 in dichloromethane is used to form a separate element by coating the solution on a conducting support as above. After drying, the two coatings are pressed together, coated side to coated side, and placed between two glass plates with provision being made for electrical contact at the nickel-conducting layers of each of the two films. An electrical potential of −1,500 volts is impressed across the two coated layers in a manner illustrated in FIG. 4. An exposure is made using a 340 nm. source at an incident exposure level of 3.5 $\times 10^4$ ergs/cm$^2$. A blue image results only in those areas effected by both electrical field and ultraviolet radiation. The two films are separated after exposure without physical damage to either element.

Example 15

The procedure of Example 14 is repeated using this time an applied potential of +1,500 volts. The resulting image is comparable to that obtained in Example 14.

Example 16

A photoconductive layer comprising 3 percent of 4-p-dimethylaminophenyl-2,6-diphenylthiapyrylium perchlorate and a polyisopropylidene-diphenylene carbonate resin (Lexan 105 from General Electric Co.) and 40 percent 4,4′-diethylamino-2,2′-dimethyltriphenylmethane is coated on a conductive support in place of the poly(n-vinylcarbazole) of the previous example. The exposure to 640 nm. radiation is carried out under an applied electrical potential of −1,500 volts to a total incident exposure of 7 $\times 10^4$ ergs/cm$^2$. A blue image is obtained in the polyyne layer only in those areas effected by both the electric field and the light. Again, the two elements are separated after exposure without physical damage to either.

Example 17

A polyyne element of the type described in Example 14 is used in conjunction with a lead oxide photoconductive layer. The lead oxide-containing element is comprised of a 20 micron thick coating of tetragonal lead monoxide dispersed in Pliolite S–5 binder which is a copolymer of styrene and butadiene at a Pbo:binder ratio of 5:1, coated on an evaporated nickel layer on a poly(ethylene terephthalate) support. An exposure of 3.2 $\times 10^3$ ergs/cm$^2$ of incident 600 nm. light is made to the polyyne layer. This results in a blue image in those areas effected by both the electric field and light.

Example 18

In order to demonstrate the reusability of the photoconductive element, the procedure of Example 17 is repeated using the same photoconductive element with a fresh sample of polyyne film. Under the conditions of exposure, an electrical potential as described in Example 17, an image is obtained comparable to that of the preceding example in both appearance and image density.

The preceding examples have involved an electrode or conducting layer in intimate contact with the polyyne material. Such intimate contact is not a prerequisite to this invention in that images can be formed in the same manner in a system utilizing a dielectric film between the electrode and the polyyne material.

Example 19

A sensitive element comprising the polyyne of Example 1 dispersed in the polymeric organic photoconductor and coated as described in Example 12 is prepared. A 12 m$\mu$ thick dielectric poly(ethylene terephthalate) film support is placed over the sensitive layer and on top of that is placed an aluminum electrode. The dielectric inner layer covered only a portion of the sensitive layer. An external potential of 1,000 volts is placed across the evaporated nickel electrode and the aluminum electrode. An imagewise exposure to approximately 6 $\times 10^{17}$ photons of irradiance from a 150 watt pulsed xenon lamp is made through the film support. As a result of the exposure, the portion of the polyyne photoconductor layer which was in contact with the electrode became dark blue while the portion which was insulated by the intervening dielectric film becomes light blue indicating that intimate physical contact between the electrode and the polyyne is not required to form a colored product by the method of the invention. This procedure is then repeated using an external potential of −1,000 volts during exposure which produces results similar to those above only the resultant density of colored photo product is lower.

Example 20

A photosensitive element of the type described in Example 19 is overlaid with a paper receiver of the type described in Gramze and Robinson U. S. Pat. No. 3,519,819, which in turn is covered with an aluminum electrode as previously. An external potential of +1,000 volts is impressed between the aluminum and the evaporated nickel electrode on imagewise exposure to a 150 watt pulsed xenon lamp of 6.05 $\times 10^4$ ergs/cm$^2$was made to the film support. As a result of the exposure, a low density blue negative image of an original is produced in the polyyne layer.

The preceding examples have involved exposure to ultraviolet or visible radiation. As discussed previously, the present invention can be used to form images by means of x-ray exposure. The following two examples are included as a further illustration of this aspect of the invention.

Example 21

A polyyne-coated film containing a binderless polyyne layer approximately 10 m$\mu$ thick is used in the manner described in Example 14 in conjunction with a lead oxide photoconductor-containing element. An external potential of +900 volts is impressed across the composite sample via the evaporated nickel electrode layers of the two films. The sample is then exposed on the photoconductor face to 228 roentgens of 50 KV x-rays with a lead imaging mask in place over the sample. The exposure results in an image of the mask in the polyyne element which exhibits a red filter transmission maximum density of 1.02. An isolated sample of the same polyyne element is exposed to the same mask to 228 roentgens of 50 KV x-rays. The latter exposure which is conducted without the application of an external electrical potential produces a polyyne image with a red filter transmission maximum density of 0.43.

Example 22

A polyyne-coated film similar to that of the preceding example, only approximately 20 mμ in thickness is exposed in the manner of Example 21 with an applied external potential of +900 volts and an x-ray exposure of 3.6 roentgens at 50 KV. The exposure produces an image with a red filter maximum transmission density of 0.5.

Example 23

A 20 percent by weight solution of 10,12-docosadiynedioic acid, monomethyl ester in dichloromethane is filtered and applied to Weyerhauser G conductive paper support at a .002 inch wet thickness. Weyerhauser paper is one which has been treated with a polyelectrolyte resulting in a bulk resistivity of $10^9$ ohm-cm. After allowing the solvent to evaporate for one hour at room temperature in atmospheric pressure, the sample is placed with the coated side in contact with the photoconductive layer of an element as described in Example 16. The base side of the polyyne element is placed in contact with a strip of aluminum foil. A step tablet comprised of 10 steps with a density increment of 0.3 is placed in contact with the base of the photoconductive element and then covered with a glass window. The entire structure is drawn together with a pressure of approximately 2 lb/in$^2$. An electric potential of 1.0 KV D.C. is applied to the sandwich with the negative power supply lead being attached to the aluminum foil and the positive lead to the conducting layer of the photoconductive element. An overall exposure of $7 \times 10^5$ erg/cm$^2$ (wavelength range 350– 700 nm.) results in a blue image of the step tablet on the coated surface of the polyyne element.

Example 24

The procedure of Example 23 is repeated substituting for the polyyne solution a 20 percent by weight solution of methyl 21-[N-(2-hydroxyethyl)carbamoyl]-10,12-heneicosadiyneoate. A blue image is produced in the polyyne layer.

Example 25

The procedure of Example 23 is repeated using this time an 8.5 percent by weight solution of octa-3,5-diynylene-1,8-bis-n-butylcarbamate in dichloromethane. A red image is produced in the polyyne layer.

Example 26

The procedure of Example 23 is repeated again using a 20 percent by weight solution of hexylammonium-20-(N-hexylcarbamoyl)-9,11-eicosadiyne-1-carboxylate in methyl alcohol. A blue image results in the polyyne layer.

Example 27

The procedure of Example 23 is repeated using a 20 percent by weight solution of 4,6-decadiyne-1,10-diol dimesylate in dichloromethane. A faint pink image is produced in the polyyne layer.

Example 28

The procedure of Example 23 is repeated using 7.5 percent by weight solution of deca-4,6-diynylene-1,10-bisphenylcarbamate in dichloromethane. A purple image is produced in the polyyne layer.

Example 29

The procedure of Example 23 is repeated using a 5 percent by weight solution of 2,4-hexadiyne-1,6-diol-bis-p-tolylurethane in acetone. A faint pink image is produced in the polyyne layer.

Example 30

The procedure of Example 23 is repeated using a 20 percent by weight solution of 1,6-bismorpholino-2,4-hexadiyne in dichloromethane. A faint yellow image is produced in the polyyne layer.

The invention has been described in detail with particular reference to certain preferred embodiments thereof, but it will be understood that variations and modifications can be effected within the spirit and scope of the invention.

We claim:

1. A radiation sensitive, direct print-out element comprising a supporting substrate including conductive means providing a surface bearing in a contiguous relationship, a photoconductive composition and a crystalline polyacetylenic compound having a minimum of two acetylenic linkages as a conjugated system.

2. An element as described in claim 1 wherein said polyacetylenic compound is in a separate layer over said photoconductive composition.

3. An element as described in claim 1 wherein said polyacetylenic compound is dispersed in said photoconductive composition.

4. An element as described in claim 1 wherein said polyacetylenic compound is 10,12-docosadiynedioic acid monomethyl ester.

5. An element as described in claim 1 wherein said polyacetylenic compound is methyl-21-[N-(2-hydroxyethyl) carbamoyl)-10, 12-heneicosadiyneoate.

6. An element as described in claim 1 wherein said polyacetylenic compound is octa-3,5-diynylene-1,8-bis-n-butylcarbamate.

7. An element as described in claim 1 wherein said polyacetylenic compound is hexylammonium-20-(N-hexylcarbamoyl)-9,11-eicosadiyne-1-carboxylate.

8. An element as described in claim 1 wherein said polyacetylenic compound is 4,6-decadiyne-1,10-diol dimesylate.

9. An element as described in claim 1 wherein said polyacetylenic compound is deca-4,6-diynylene-1,10-bisphenylcarbamate.

10. An element as described in claim 1 wherein said polyacetylenic compound is 2.4-hexadiyne-1,6-diol-bis-p-tolylurethane.

11. An element as described in claim 1 wherein said polyacetylenic compound is 1,6-bismorpholino-2,4-hexadiyne.

12. An element as described in claim 1 wherein said photoconductive layer is comprised of a film-forming binder and a photoconductor.

13. A multilayered direct print-out element comprising a conductive support bearing a layer of a photoconductive composition having thereon a layer of a crystalline polyacetylenic compound having a minimum of two acetylenic linkages as a conjugated system.

14. An element as described in claim 13 wherein said layer of polyacetylenic compound contains a binder material.

15. An element as described in claim 14 wherein said binder material is gelatin.

16. A direct print-out element comprising a translucent conductive support bearing a layer of a translucent photoconductive composition which has thereon a layer of a crystalline polyacetylenic compound having a minimum of two acetylenic linkages as a conjugated system, said crystalline compound having an average particle size of about 0.1 to about 1.5 microns.

17. A method of forming direct print-out images comprising the steps of imagewise exposing a radiation sensitive element comprising a support providing a conductive surface portion bearing a photoconductive composition having in contiguous relationship therewith a crystalline polyacetylenic compound having a minimum of two acetylenic linkages as a conjugated system, said exposure occurring during the application of an electric potential across said photoconductive composition and the contiguous polyacetylenic compound to imagewise polymerize said compound to a colored polymeric product.

18. A method of forming direct print-out images comprising the steps of (1) placing together (a) a layer of a crystalline polyacetylenic compound having a minimum of two acetylenic linkages as a conjugated system and (b) a layer of a photoconductive composition and (2) imagewise exposing said photoconductive composition during the application of an electric potential across said layers to imagewise polymerize said compound to a colored polymeric product.

19. A method of forming direct print-out images comprising the steps of applying an electric potential across a sensitive composition comprising a photoconductive composition in contiguous relationship with a crystalline polyacetylenic compound and imagewise exposing said sensitive composition to imagewise polymerize said polyacetylenic compound.

20. The invention as described in claim 19 wherein said sensitive composition comprises a mixture of a binder, a photoconductor and a crystalline polyacetylenic having a minimum of two acetylenic linkages as a conjugated system.

21. The invention as described in claim 19 wherein said sensitive composition comprises a layer of a photoconductor and a polymeric binder in contact with a layer of a crystalline polyacetylenic compound having a minimum of two acetylenic linkages as a conjugated system.

* * * * *